(12) United States Patent
Gogo et al.

(10) Patent No.: US 8,695,747 B2
(45) Date of Patent: Apr. 15, 2014

(54) REAR-WHEEL SUSPENSION FOR TWO-WHEELED VEHICLE

(75) Inventors: Kazuhiko Gogo, Saitama (JP); Tomohiro Fuse, Saitama (JP); Mikio Uchiyama, Saitama (JP); Eiji Adachi, Saitama (JP); Taichi Honda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1000 days.

(21) Appl. No.: 11/699,367

(22) Filed: Jan. 30, 2007

(65) Prior Publication Data

US 2007/0175691 A1    Aug. 2, 2007

(30) Foreign Application Priority Data

Feb. 1, 2006   (JP) .................................. 2006-024335

(51) Int. Cl.
*B62K 25/28* (2006.01)

(52) U.S. Cl.
CPC ..................................... *B62K 25/28* (2013.01)
USPC ............................ 180/227; 180/219; 280/227

(58) Field of Classification Search
USPC ........... 180/227, 219; 280/284, 285; 267/190, 267/34, 35; 188/275, 276
See application file for complete search history.

(56) References Cited

U.S. PATENT DOCUMENTS

| | | | | |
|---|---|---|---|---|
| 2,357,278 A | * | 8/1944 | O'Connor | 188/269 |
| 4,273,220 A | | 6/1981 | Tilkens | |
| 4,360,214 A | * | 11/1982 | Isono | 280/284 |
| 4,485,885 A | * | 12/1984 | Fukuchi | 180/227 |
| 4,582,343 A | * | 4/1986 | Waugh | 280/284 |
| 4,673,053 A | * | 6/1987 | Tanaka et al. | 180/227 |
| 4,721,179 A | * | 1/1988 | Yamaguchi et al. | 180/219 |
| 4,805,716 A | * | 2/1989 | Tsunoda et al. | 180/219 |
| RE34,897 E | * | 4/1995 | Richardson et al. | 180/227 |
| 6,267,400 B1 | * | 7/2001 | McAndrews | 280/285 |
| 7,264,073 B2 | * | 9/2007 | Nakagawa et al. | 180/68.5 |
| 7,328,910 B2 | * | 2/2008 | Czysz | 280/284 |
| 7,392,977 B2 | * | 7/2008 | Miyashiro et al. | 267/179 |
| 7,438,149 B2 | * | 10/2008 | Ishida et al. | 180/227 |
| 7,472,772 B2 | * | 1/2009 | Ozeki | 180/218 |
| 2004/0178012 A1 | * | 9/2004 | Takano | 180/227 |
| 2004/0178599 A1 | * | 9/2004 | Ozeki | 280/124.128 |
| 2004/0222693 A1 | * | 11/2004 | Toyoda | 301/110.5 |
| 2005/0046141 A1 | | 3/2005 | Gogo et al. | |
| 2005/0082104 A1 | | 4/2005 | Miyakozawa et al. | |

(Continued)

FOREIGN PATENT DOCUMENTS

| | | |
|---|---|---|
| EP | 1 418 364 | 5/2004 |
| EP | 1449758 A2 | 9/2004 |

(Continued)

*Primary Examiner* — Anne Marie Boehler
*Assistant Examiner* — Maurice Williams
(74) *Attorney, Agent, or Firm* — Birch, Stewart, Kolasch & Birch, LLP

(57) ABSTRACT

A rear-wheel suspension system for a two-wheeled vehicle capable of further reducing a vehicle width. An upper end of a coil spring of a shock absorber includes a tubular damper case, a rod connected to a piston disposed within the shock absorber and protrusively provided to be capable of making strokes with respect to the tubular damper case and an external hydraulic sub-tank positioned to be lower than an upper end of the shock absorber. Vehicle body component parts include a connecting tube and the sub-tank disposed to be close to the shock absorber above the coil spring.

28 Claims, 5 Drawing Sheets

(56) References Cited

U.S. PATENT DOCUMENTS

| | | | |
|---|---|---|---|
| 2005/0087947 A1* | 4/2005 | Fujita | 280/124.128 |
| 2005/0178626 A1 | 8/2005 | Turner et al. | |
| 2005/0236206 A1* | 10/2005 | Miyashiro | 180/227 |
| 2005/0284681 A1* | 12/2005 | Satou | 180/227 |
| 2006/0054371 A1* | 3/2006 | Horiuchi | 180/227 |

FOREIGN PATENT DOCUMENTS

| | | |
|---|---|---|
| JP | 1-226485 A | 9/1989 |
| JP | 2-24113 U | 2/1990 |
| JP | 3-271091 A | 12/1991 |
| JP | 7-208529 A | 8/1995 |
| JP | 2522667 Y2 | 10/1996 |
| JP | 2522667 Y2 | 1/1997 |
| JP | 2000-103380 A | 4/2000 |
| JP | 2006-7876 A | 1/2006 |
| JP | 2006-57661 A | 3/2006 |
| WO | WO 2005/002953 | 1/2005 |

* cited by examiner

REAR-WHEEL SUSPENSION FOR TWO-WHEELED VEHICLE

CROSS-REFERENCE TO RELATED APPLICATIONS

The present application claims priority under 35 USC 119 to Japanese Patent Application No. 2006-024335 filed on Feb. 1, 2006 the entire contents of which are hereby incorporated by reference.

BACKGROUND OF THE INVENTION

1. Field of the Invention

The present invention relates to a rear-wheel suspension system for a two-wheeled vehicle.

2. Description of Background Art

A rear-wheel suspension system for a two-wheeled vehicle is known wherein a swing arm is provided with a front portion that is pivotally supported by a vehicle body frame and extends rearwardly from a head pipe. A rear portion supports a rear wheel. A shock absorber is provided that is disposed such that its longitudinal direction coincides with a vertical direction. An upper portion of the shock absorber is pivotally supported between center frames and a rear portion is pivotally supported by the swing arm, The related-art shock absorber is disposed such that a buffer is positioned above the shock absorber and a coil spring is positioned in a state that is close thereto. A vehicle body component part such as an outlet case is placed at a lateral position of the coil spring. See, for example, JP-Y No. 2522667 (Page 2, FIG. 2).

Thus, in the related-art rear-wheel suspension system for a two-wheeled vehicle, the buffer and the coil spring are disposed to be close to each other. The close arrangement requires a space corresponding to the outer diameter of the spring. In addition, the vehicle body component part such as the outlet case is disposed at a lateral position of the coil spring, which imposes a limitation on the dimensions of the system.

SUMMARY AND OBJECTS OF THE INVENTION

Therefore, the present invention has been developed in consideration of such a situation, and it is an object of an embodiment of the present invention to provide a rear-wheel suspension system for a two-wheeled vehicle, capable of further deducing the vehicle width.

For achieving this object according to an embodiment of the present invention, a rear-wheel suspension system for a two-wheeled vehicle according to the present invention employs the following technical measures.

More specifically, a rear-wheel suspension system for a two-wheeled vehicle according to an embodiment of the present invention includes a pair of right- and left-side center frames connected to a rear portion of a main frame extending rearwardly from a head pipe and extending downwardly. A swing arm includes a front portion which is pivotally supported by the center frames and a rear portion for supporting a rear wheel. A shock absorber, disposed such that its longitudinal direction coincides with a vertical direction, includes an upper portion which is pivotally supported on a vehicle body side between the center frames. A lower portion of the shock absorber is pivotally supported on the swing arm side. The shock absorber includes a tubular buffer and a spring disposed around the buffer with an upper end of the spring being positioned to be lower than an upper end of the buffer. A vehicle body component part is placed to be close to the buffer above the spring.

In the rear-wheel suspension system for a two-wheeled vehicle according to an embodiment of the present invention, the vehicle body component part is an intake-system part for making a connection between an engine disposed in front of the buffer and an air cleaner disposed to the rear of the buffer.

In the rear-wheel suspension system for a two-wheeled vehicle according to an embodiment of the present invention, the vehicle body component part is a sub-tank which is a component part of the buffer.

A rear-wheel suspension system for a two-wheeled vehicle according to an embodiment of the present invention includes a pair of right- and left-side center frames connected to a rear portion of a main frame extending rearwardly and downwardly from a head pipe. A swing arm includes a front portion which is pivotally supported by the center frames and a rear portion which is made to support a rear wheel. A shock absorber, disposed such that its longitudinal direction coincides with a vertical direction, is provided with an upper portion which is pivotally supported on a vehicle body side between the center frames and a lower portion which is pivotally supported on the swing arm side. The shock absorber includes a buffer with a tubular cylinder and a spring disposed around the buffer. An upper end of the spring is positioned to be lower than an upper end of the cylinder and a sub-tank is integrally formed in a state that is close to the cylinder above the spring so as to combine a portion of a wall surface constituting the cylinder and a portion of a wall surface constituting the sub-tank.

According to an embodiment of the present invention, a buffer constituting a shock absorber is disposed on an upper side. A ring-like mounting position of a coil spring is placed on an lower side with a vehicle body component part being disposed to be brought close to or abut on the buffer above the coil spring. This enables the vehicle body component part to be shifted toward the interior side of the vehicle body by a dimension corresponding to the coil spring. Thus, a reduction in the dimensions of the width of the vehicle are obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A description will be given of an embodiment of a rear-wheel suspension system for a two-wheeled vehicle according to the present invention. As an example, the rear-wheel suspension system for a two-wheeled vehicle according to the present invention is applied to an off-road two-wheeled vehicle including a four-cycle single-cylinder engine. A detailed description will be omitted except a construction section of a rear-wheel suspension system which forms an essential part.

Figure 1:
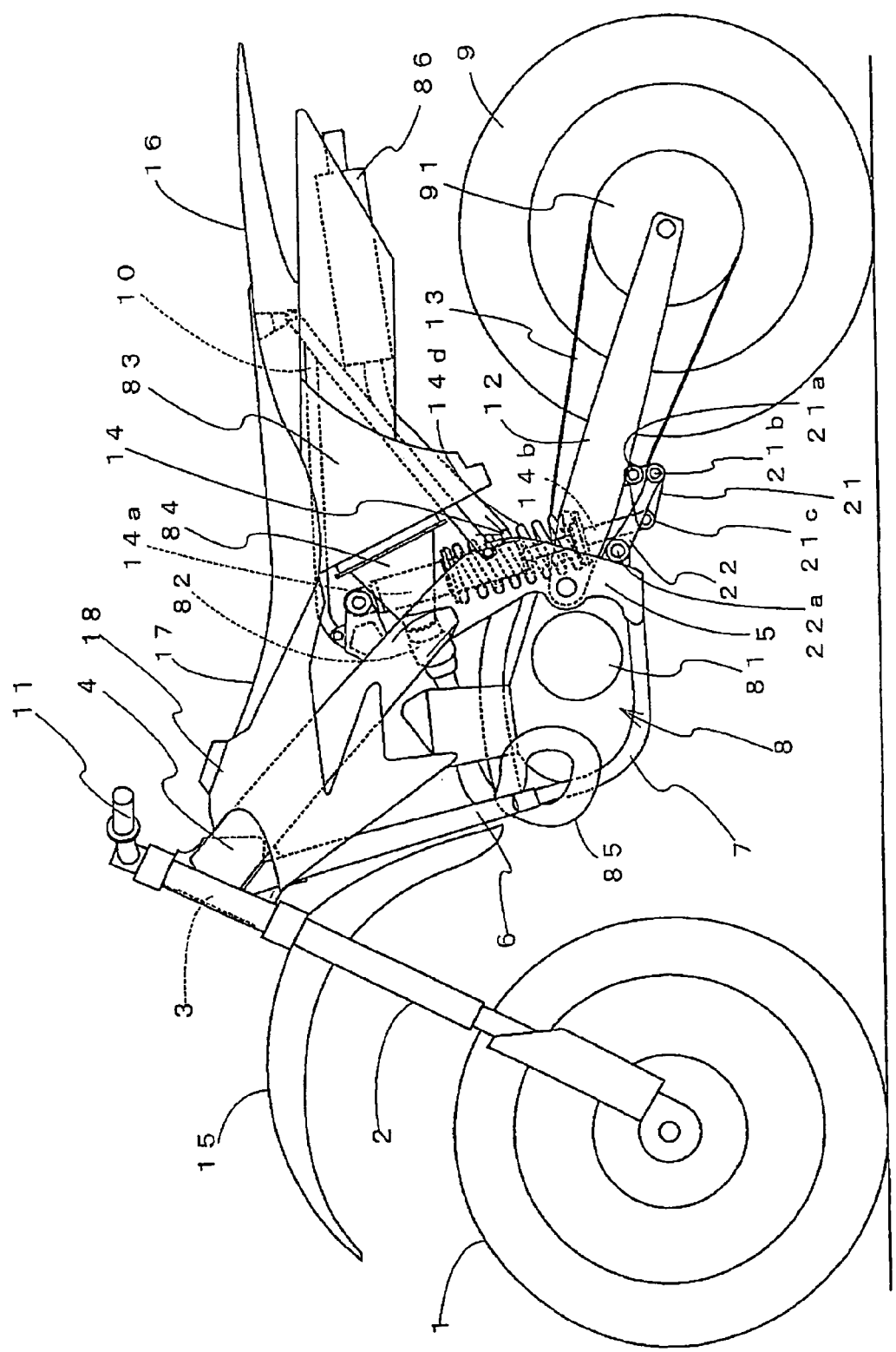
FIG. 1 is a side-elevational view showing a two-wheeled vehicle having a rear-wheel suspension system for a two-wheeled vehicle according to an embodiment of the invention.

As shown in FIG. 1, the basic construction of a motorcycle according to this embodiment includes a front suspension 2 for pivotally supporting a front wheel 1. A head pipe 3 is provided for pivotally supporting the front suspension 2. A main frame 4 extending with two-branches rearwardly from the head pipe 3. A pair of right-side and left-side center frames 5 are connected to a rear portion of the main frame 4 and extend downwardly. A down frame 6 and lower frame 7 are joined so as to connect lower portions of the center frames 5 and the head pipe 3. A power unit 8 includes a four-cycle single-cylinder engine. A seat rail 10 extends to above a rear wheel 9 attached to the center frames 5. A handlebar 11 is connected to the front suspension 2. A swing arm 12 includes a front portion pivotally supported by the center frames 5 and a rear portion for supporting the rear wheel 9. A sprocket 91 and chain 13 transmit the driving force of the power unit 8 to the rear wheel 9. A shock absorber 14, disposed such that its longitudinal direction coincides with a vertical direction, includes an upper portion pivotally supported between the center frames 5 and a lower portion rotationally supported through a link mechanism. A front fender 15 is positioned to cover the front wheel 1 with a rear fender 15 being positioned to cover the rear wheel 9. A seat 17 is set on the seat rail 10 with a fuel tank 18 located at an upper portion of a front side of the vehicle body. The two-wheeled vehicle may be operated by a handlebar and by use of a throttle and other controls operated by a rider sitting on the seat 17.

The above-mentioned power unit 8 includes a four-cycle single-cylinder engine 81 located in a region defined by the main frame 4, the center frames 5, the down frame 6 and the lower frame 7. A throttle body 82 is attached to an intake side of the engine 81 with an air cleaner 83, a connecting tube (intake system part) 84 for making a connection between the throttle body 82 and the air cleaner 83 and a muffler 86 equipped with an exhaust pipe 85 secured to the exhaust side of the engine 81.

The rear-wheel suspension according to an embodiment of the present invention is used with the above-mentioned construction of the motorcycle having the center frames 5, the swing arm 12, the shock absorber 14 and the connecting tuber 84 (intake system part).

Figure 2:
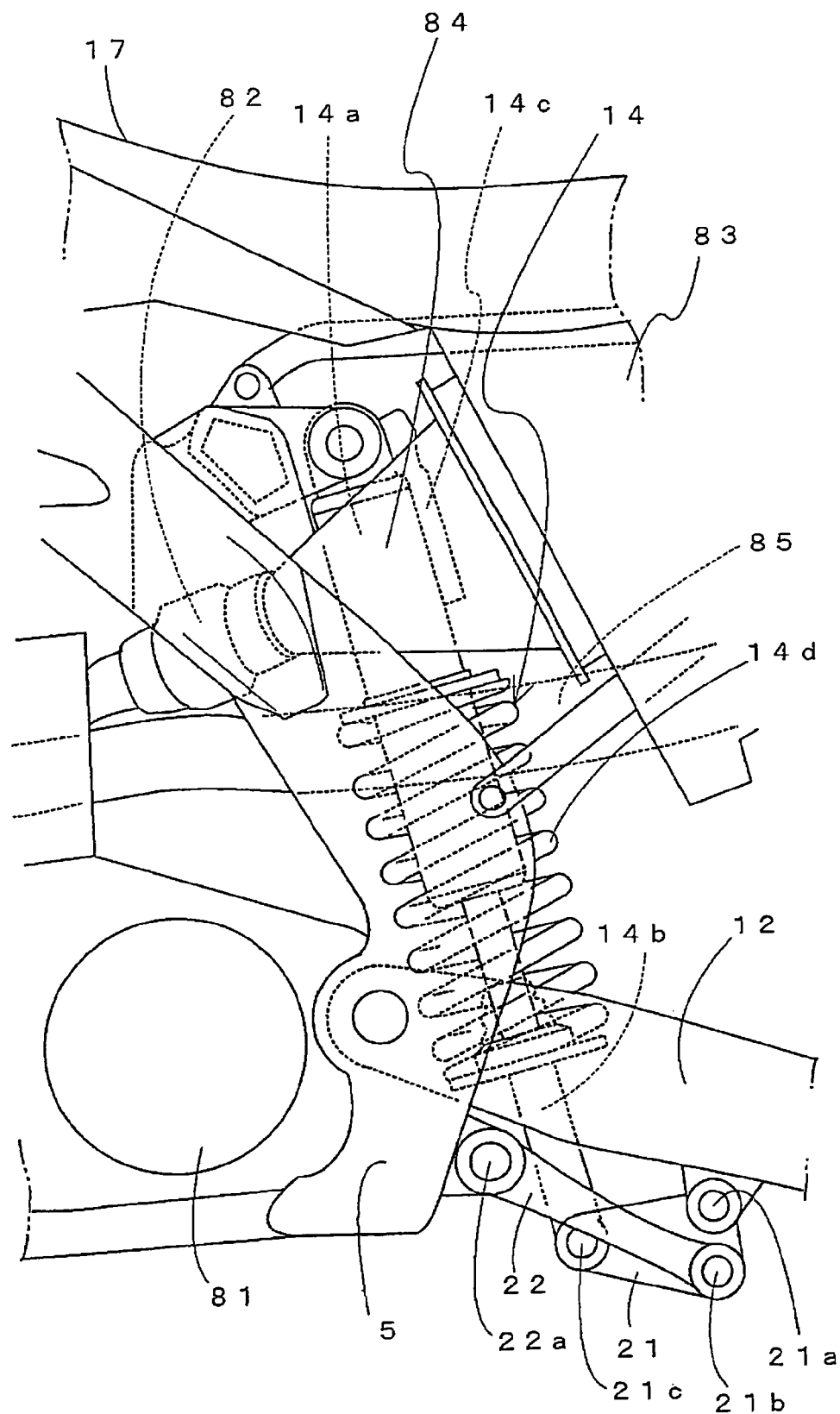
FIG. 2 is an enlarged side-elevational view showing an essential part of the present invention in FIG. 1.

The center frames 5 are a pair of right-side and left-side frames each of which is connected to rear portions of the main frame 4 extending in a two-branch fashion rearwardly from the head pipe 3. As shown in FIG. 2, a cross pipe 19 is laid to make a connection between upper parts of the center frames 5. Moreover, in the vicinity of the cross pipe 19 for the center frames 5, cushion blankets 20, each having a bearing portion 20a made therein, extend to confront each other toward their insides.

The swing arm 12 is shaped into a plan-viewed gate configuration so that a front portion thereof is pivotally supported by lower portions of the center frames 5 to be swingable in vertical directions. The rear wheel 9 is rotatably supported by a rear portion of the swing arm 12. At a portion under the front side of the swing arm 12, a first pivotally supporting portion 21a of a first link member 21 includes a generally triangular configuration, provided in confronting relation thereto, that is pivotally supported. A second pivotally supporting portion 21b is formed at a lower position than the first pivotally supporting section 21a and is pivotally engaged with a bar-like second link member 22 pivotally supported by a fourth pivotally supporting portion 22a provided in the center frames 5 at a lower position than a pivotally supporting portion between the center frames 5 and the swing arm 12. In addition, a third pivotally supporting portion 21c is positioned in front of the first link member 21 with the generally triangular configuration being pivotally supported by the tip of a rod 14b.

Figure 5:
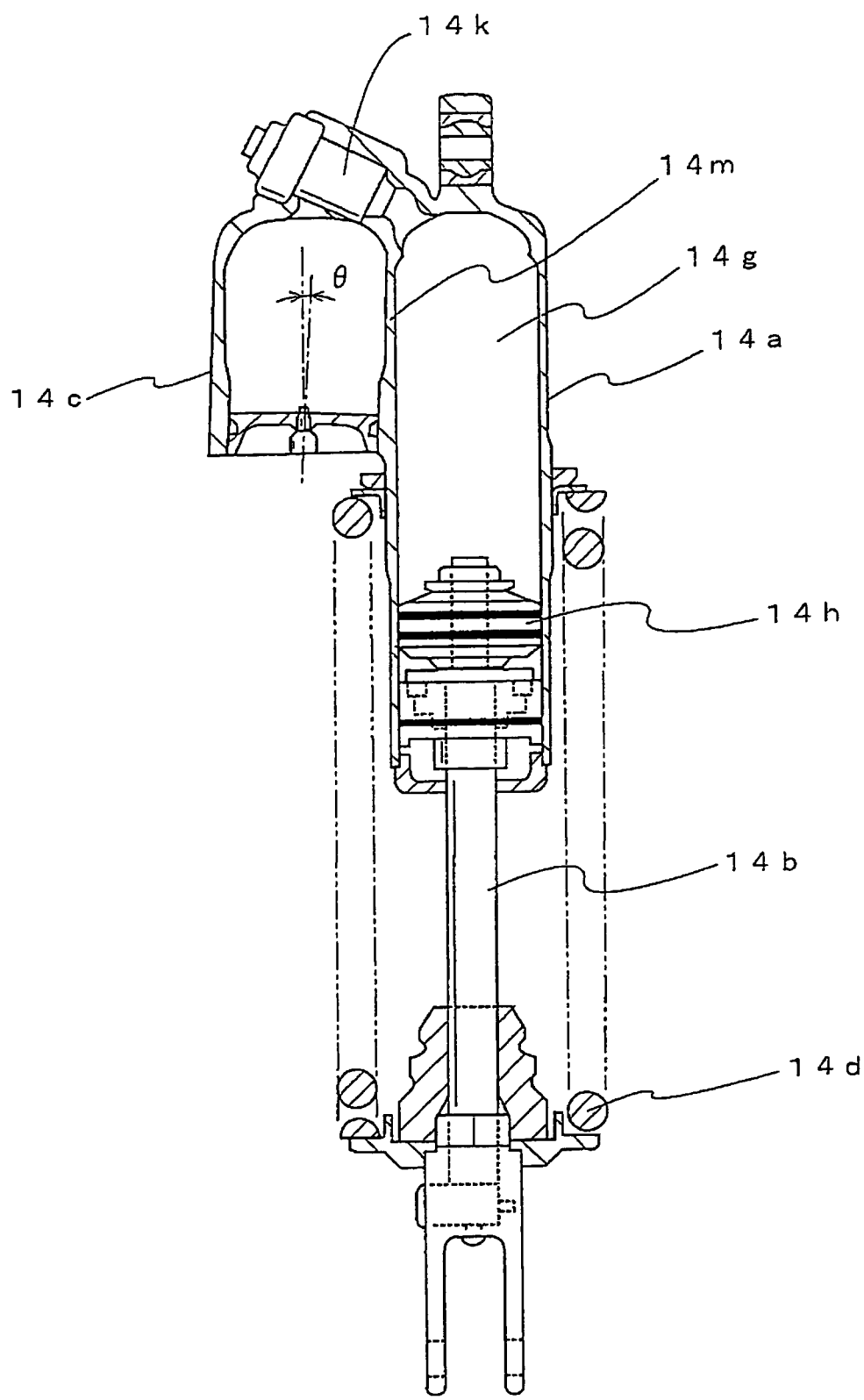
FIG. 5 is a vertical cross-sectional view showing a shock absorber.

As shown in FIGS. 2 and 5, the shock absorber (buffer) 14 is a so-called shock absorber having a tubular damper case 14a internally including a cylinder 14g. The rod 14b is connected to a piston 14h protrusively positioned in the interior of the damper case 14a to be capable of making strokes with respect to the damper case 14a. An external hydraulic sub-tank 14c (vehicle body component part), with a coil spring 14d is circularly mounted so as to extend over the rod 14b and the damper case 14a.

In addition, in comparison with a related-art shock absorber, in the case of this shock absorber 14, the position of the coil spring 14d is shifted further downwardly. In addition, the sub-tank 14c (vehicle body component part) and the damper case 14a are integrated through a wall surface 14m, combining them, to form a housing so that they are placed side by side in a vehicle width direction. The cylinder 14g communicates through a damping force control valve 14k with the interior of the sub-tank 14c.

As shown in FIG. 5, the center line of the sub-tank 14c is not in parallel with the center lines of the damper case 14a, the rod 14b and others, and a lower portion of the sub-tank 14c is slightly inclined outwardly to make a required angle $\theta$ (preferably, approximately 2°), which improves the workability of the sub-tank 14c.

Figure 3:
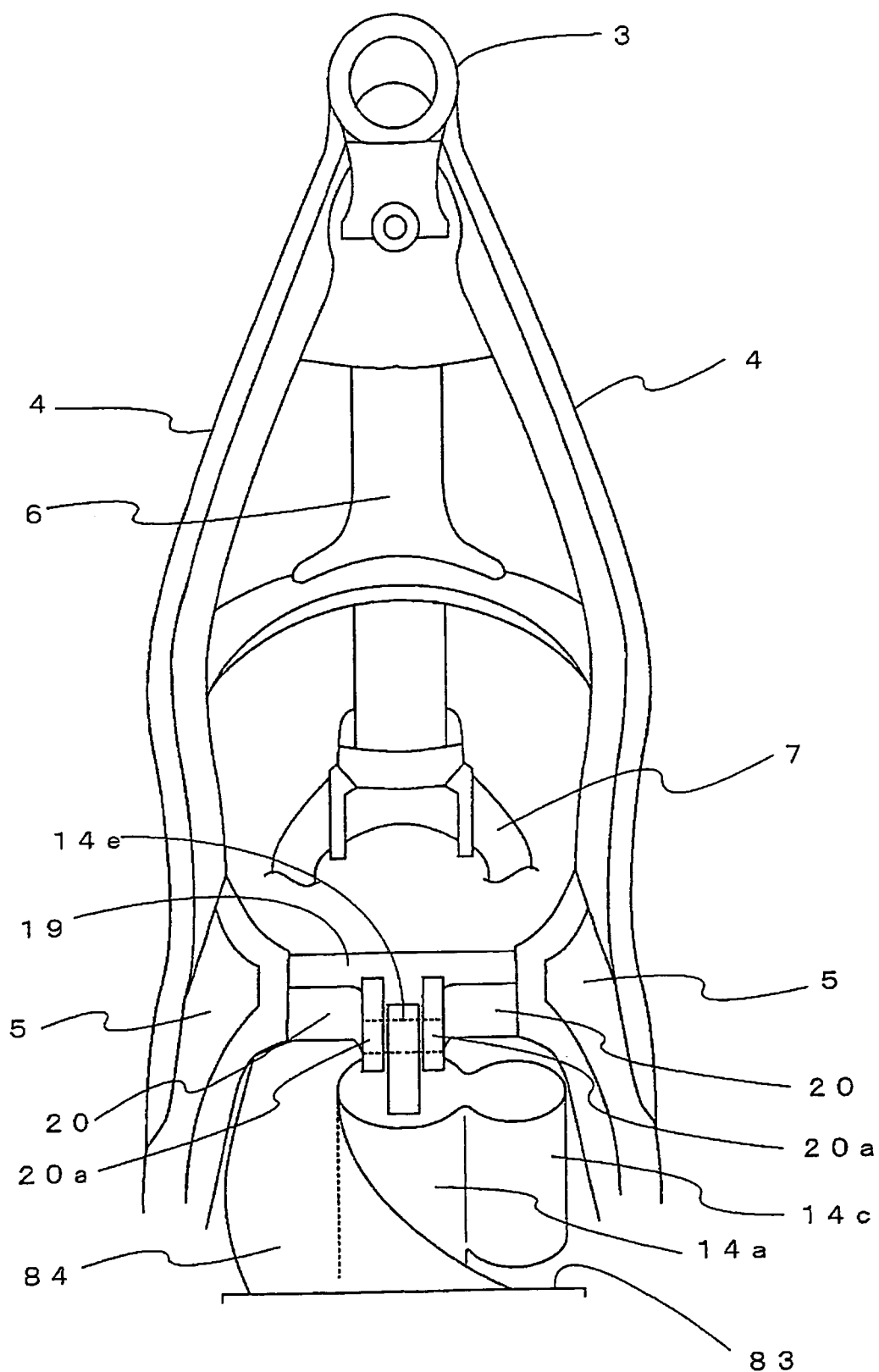
FIG. 3 is a plan view simply showing a center frame and peripheral portions as the essential part of the present invention.

In the shock absorber 14 thus constructed, a first fitting portion 14e lying on an upper side of the damper case 14a is pivotally supported between the bearing portions 20a of the shock absorber brackets 20 formed protrusively to confront the insides of the center frames 5. A second fitting portion 14f is provided on a tip portion of the rod 14b and is pivotally supported by the third pivotally supporting portion 21c of the first link member 21 provided at a lower portion near the front side of the swing arm 12. As shown in FIGS. 1 to 3, the damper case 14a is fitted to be slightly inclined in the forward direction and is located at a generally central position in the vehicle width direction.

In this embodiment, the shock absorber 14 and the swing arm 12 are connected to each other through the first link member 21 and the second link member 22, thereby varying the stroke amount of the rod 14b with respect to the swinging angle of the rear wheel 9. More specifically, although a sufficient shock absorber characteristic is obtainable when the rear wheel 9 is deeply lowered, there is no restriction on this. However, it is also appropriate that the shock absorber 14 and the swing arm 12 are directly connected to each other.

Figure 4:
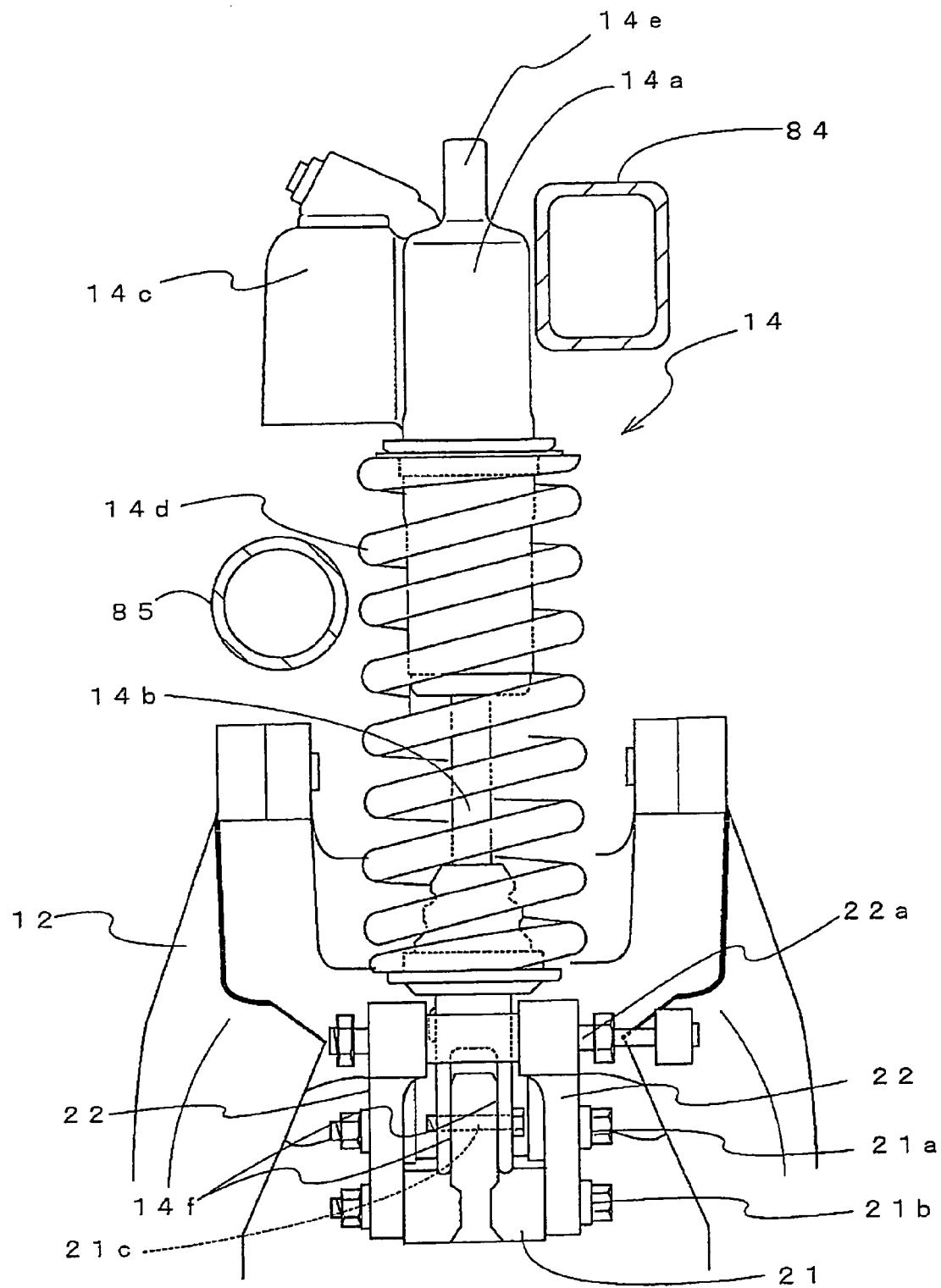
FIG. 4 is a front-elevational view simply showing a shock absorber and peripheral portions as the essential part of the present invention.

As shown in FIGS. 1 and 2, the connecting tube 84 (intake system part) is a curved tubular member for making a connection between the throttle body 82 placed in front of the shock absorber 14 and the air cleaner 83 placed in the rear of the shock absorber 14. As shown in FIGS. 3 and 4, the connecting tube 84 is disposed to be close to the damper case 14a so as to detour from the opposite side to the sub-tank 14c.

The connecting tube 84 and the sub-tank 14c are located at the right and left sides, respectively, in a state wherein the damper case 14a is interposed therebetween. The muffler 86 is placed on the sub-tank 14c side.

Since it is not easy to change the height layout of this connecting tube 84 greatly from the viewpoint of the layout of the power unit 8, in a state where this height position is taken as an absolute position, according to this embodiment, the position of the coil spring 14d is shifted downwardly so that the connecting tube 84 and the sub-tank 14c are moved toward the interior of the vehicle body by a dimension corresponding to the coil spring 14d.

As described above, in the rear-wheel suspension system according to this embodiment, the position of the coil spring 14d is shifted downwardly so as to move the vehicle body component parts such as the connecting tube 84 and the sub-tank 14c toward the interior of the vehicle body by a dimension corresponding to the coil spring 14d, which can further reduce the width dimension of the vehicle body.

This reduction in the vehicle width improves the rider foot-landing characteristic and, with respect to the connecting tube 84, the detour for preventing an interference with the shock absorber 14 is further reduced in comparison with the related-art shock absorber. Thus, further improvements with respect to the intake efficiency are expected.

Although a rear-wheel suspension system for a two-wheeled vehicle according to this embodiment has been described above, the above-described embodiment relates to one example of the best mode of the present invention, and the present invention is not limited to this but it is acceptable to cover all changes of the embodiment herein which do not constitute departures from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear-wheel suspension system for a two-wheeled vehicle comprising:
   a pair of right- and left-side center frames connected to a rear portion of a main frame extending rearwardly and downwardly from a head pipe;
   a swing arm having a front portion pivotally supported by the center frames and a rear portion for supporting a rear wheel; and
   a shock absorber, wherein a longitudinal direction of the shock absorber coincides with a vertical direction, the shock absorber having an upper portion pivotally supported on a vehicle body side between the center frames and a lower portion pivotally supported on the swing arm side;
   wherein the shock absorber includes a tubular buffer and a spring disposed around the buffer with an upper end of the spring being positioned to be lower than an upper end of the buffer and a vehicle body component part being placed at a lateral side of the buffer, a bottom end of the vehicle body component being located above the upper end of the spring and below the upper end of the buffer,
   wherein a center line of a sub-tank that is the vehicle body component part is non-parallel with a center line of a damper case of the buffer, and
   wherein the center line of the sub-tank is slightly inclined outwardly compared to the center line of the damper case of the buffer.

2. The rear-wheel suspension system for a two-wheeled vehicle according to claim 1, further comprising an intake-system part for making a connection between an engine disposed in front of the buffer and an air cleaner disposed in the rear of the buffer, wherein the intake-system part is placed at the later side of the buffer, and a bottom end of the intake-system part is located above the upper end of the buffer.

3. The rear-wheel suspension system for a two-wheeled vehicle according to claim 1, wherein the sub-tank forms a component part of the buffer.

4. The rear-wheel suspension system for a two-wheeled vehicle according to claim 1, wherein the tubular buffer includes a tubular damper case as the damper case with a cylinder formed therein with a piston and a piston rod operatively movable within said cylinder, said piston rod projecting outside the tubular damper case and being engaged at a distal end thereof with said spring.

5. The rear-wheel suspension system for a two-wheeled vehicle according to claim 4, wherein said tubular buffer has a predetermined length with a spring engaging portion being formed at a position displaced from said upper end of said tubular buffer and said tubular buffer extending downwardly from said spring engaging portion for enabling said piston and said piston rod to be movable within said cylinder in a range above and below said spring engaging portion.

6. The rear-wheel suspension system for a two-wheeled vehicle according to claim 4, and further including a sub-tank operatively connected to said tubular buffer with a damping force control valve being in communication with said cylinder and said sub-tank for providing communication therebetween.

7. The rear-wheel suspension system for a two-wheeled vehicle according to claim 6, wherein said sub-tank and said tubular buffer are integrally formed with a common wall divided therebetween, a first lateral wall surface of the common wall constituting a portion of an inner surface the cylinder, a second lateral wall surface of the common wall constituting a portion of an inner surface the sub-tank, the second lateral wall surface of the common wall being opposite to the first lateral wall surface of the common wall.

8. The rear-wheel suspension system for a two-wheeled vehicle according to claim 1, wherein a muffler is placed on the same side as a sub-tank that is the vehicle body component part.

9. The rear-wheel suspension system for a two-wheeled vehicle according to claim 1, wherein the center line of the sub-tank and the center line of the damper case of the buffer both extend downwardly toward the rear wheel.

10. A rear-wheel suspension system for a two-wheeled vehicle comprising:
   a pair of right- and left-side center frames connected to a rear portion of a main frame extending rearwardly and downwardly from a head pipe;
   a swing arm having a front portion pivotally supported by the center frames and a rear portion for supporting a rear wheel; and
   a shock absorber, wherein a longitudinal direction of the shock absorber coincides with a vertical direction, the shock absorber having an upper portion pivotally supported on a vehicle body side between the center frames and a lower portion pivotally supported on the swing arm side;

wherein the shock absorber includes a buffer with a tubular cylinder and a spring disposed around the buffer, and an upper end of the spring is positioned to be lower than an upper end of the cylinder, and a sub-tank is integrally formed with the tubular cylinder above the spring, the sub-tank and the tubular cylinder being divided by a common wall, a first lateral wall surface of the common wall constituting a portion of an inner surface the cylinder, a second lateral wall surface of the common wall constituting a portion of an inner surface the sub-tank, the second lateral wall surface of the common wall being opposite to the first lateral wall surface of the common wall, wherein a center line of the sub-tank is non-parallel with a center line of a damper case of the buffer, and wherein the center line of the sub-tank and the center line of the damper case of the buffer both extend downwardly toward the rear wheel.

11. The rear-wheel suspension system for a two-wheeled vehicle according to claim 10, wherein the cylinder includes a piston and a piston rod operatively movable within said cylinder, said piston rod projecting outside the buffer and being engaged at a distal end thereof with said spring.

12. The rear-wheel suspension system for a two-wheeled vehicle according to claim 11, wherein said cylinder has a predetermined length with a spring engaging portion being formed at a position displaced from said upper end of said cylinder and said tubular buffer extending downwardly from said spring engaging portion for enabling said piston and said piston rod to be movable within said cylinder in a range above and below said spring engaging portion.

13. The rear-wheel suspension system for a two-wheeled vehicle according to claim 11, and further including a sub-tank operatively connected to said tubular buffer with a damping force control valve being in communication with said cylinder and said sub-tank for providing communication therebetween.

14. The rear-wheel suspension system for a two-wheeled vehicle according to claim 13, wherein said sub-tank and said cylinder are integrated relative to each other with the common wall formed therebetween forming a substantially a figure eight in an outer circumference thereof.

15. The rear-wheel suspension system for a two-wheeled vehicle according to claim 10, wherein a muffler is placed on the same side as the sub-tank.

16. The rear-wheel suspension system for a two-wheeled vehicle according to claim 10, wherein the center line of the sub-tank is slightly inclined outwardly compared to the center line of the damper case of the buffer.

17. A rear-wheel suspension system for use with a vehicle comprising:

a swing arm having a front portion pivotally supported by a vehicle body frame and a rear portion for supporting a rear wheel; and a shock absorber having an upper portion pivotally supported on the vehicle body frame and a lower portion pivotally supported on the swing arm;

wherein the shock absorber includes a tubular buffer and a spring disposed around the buffer with an upper end of the spring being positioned to be lower than an upper end of the buffer and a vehicle body component part being placed at a lateral side of the buffer, a bottom end of the vehicle body component being located above the upper end of the spring and below the upper end of the buffer, wherein a center line of a sub-tank that is the vehicle body component part is non-parallel with a center line of a damper case of the buffer, and wherein the center line of the sub-tank is slightly inclined outwardly compared to the center line of the damper case of the buffer.

18. The rear-wheel suspension system for use with a vehicle according to claim 17, further comprising an intake-system part for making a connection between an engine disposed in front of the buffer and an air cleaner disposed in the rear of the buffer, wherein the intake-system part is placed at the later side of the buffer, and a bottom end of the intake-system part is located above the upper end of the buffer.

19. The rear-wheel suspension system for use with a vehicle according to claim 17, wherein the sub-tank forms a component part of the buffer.

20. The rear-wheel suspension system for use with a vehicle according to claim 17, wherein the tubular buffer includes a tubular damper case as the damper case with a cylinder formed therein with a piston and a piston rod operatively movable within said cylinder, said piston rod projecting outside the tubular damper case and being engaged at a distal end thereof with said spring.

21. The rear-wheel suspension system for use with a vehicle according to claim 20, wherein said tubular buffer has a predetermined length with a spring engaging portion being formed at a position displaced from said upper end of said tubular buffer and said tubular buffer extending downwardly from said spring engaging portion for enabling said piston and said piston rod to be movable within said cylinder in a range above and below said spring engaging portion.

22. The rear-wheel suspension system for use with a vehicle according to claim 20, and further including a sub-tank operatively connected to said tubular buffer with a damping force control valve being in communication with said cylinder and said sub-tank for providing communication therebetween.

23. The rear-wheel suspension system for use with a vehicle according to claim 22, wherein said sub-tank and said tubular buffer are integrally formed with a common wall divided therebetween, a first lateral wall surface of the common wall constituting a portion of an inner surface the cylinder, a second lateral wall surface of the common wall constituting a portion of an inner surface the sub-tank, the second lateral wall surface of the common wall being opposite to the first lateral wall surface of the common wall.

24. The rear-wheel suspension system for a two-wheeled vehicle according to claim 17, wherein a muffler is placed on the same side as a sub-tank that is the vehicle body component part.

25. The rear-wheel suspension system for a two-wheeled vehicle according to claim 17, wherein the center line of the sub-tank and the center line of the damper case of the buffer both extend downwardly toward the rear wheel.

26. A rear-wheel suspension system for a two-wheeled vehicle comprising:

a pair of right- and left-side center frames connected to a rear portion of a main frame extending rearwardly and downwardly from a head pipe;

a swing arm having a front portion pivotally supported by the center frames and a rear portion for supporting a rear wheel; and a shock absorber, wherein a longitudinal direction of the shock absorber coincides with a vertical direction, the shock absorber having an upper portion pivotally supported on a vehicle body side between the center frames and a lower portion pivotally supported on the swing arm side;

wherein the shock absorber includes a tubular buffer and a spring disposed around the buffer with an upper end of the spring being positioned to be lower than an upper end of the buffer and a vehicle body component part being placed at a lateral side of the buffer, a bottom end of the vehicle body component being located above the upper end of the spring and below the upper end of the buffer, and wherein a connecting tube, which connects a throttle body placed in front of a cushion unit and an air cleaner placed in rear of the cushion unit, and a sub-tank that is the vehicle body component part are located at the right side and the left side, respectively, in a state where a damper case of the buffer is interposed therebetween, and the connecting tube is located to be close to the buffer above the spring.

27. A rear-wheel suspension system for a two-wheeled vehicle comprising:
a pair of right- and left-side center frames connected to a rear portion of a main frame extending rearwardly and downwardly from a head pipe;
a swing arm having a front portion pivotally supported by the center frames and a rear portion for supporting a rear wheel; and
a shock absorber, wherein a longitudinal direction of the shock absorber coincides with a vertical direction, the shock absorber having an upper portion pivotally supported on a vehicle body side between the center frames and a lower portion pivotally supported on the swing arm side;
wherein the shock absorber includes a buffer with a tubular cylinder and a spring disposed around the buffer, and an upper end of the spring is positioned to be lower than an upper end of the cylinder, and a sub-tank is integrally formed with the tubular cylinder above the spring, the sub-tank and the tubular cylinder being divided by a common wall, a first lateral wall surface of the common wall constituting a portion of an inner surface the cylinder, a second lateral wall surface of the common wall constituting a portion of an inner surface the sub-tank, the second lateral wall surface of the common wall being opposite to the first lateral wall surface of the common wall, and wherein a connecting tube, which connects a throttle body placed in front of a cushion unit and an air cleaner placed in rear of the cushion unit, and the sub-tank are located at the right side and the left side, respectively, in a state where a damper case of the buffer is interposed therebetween, and the connecting tube is located to be close to the buffer above the spring.

28. A rear-wheel suspension system for use with a vehicle comprising:
a swing arm having a front portion pivotally supported by a vehicle body frame and a rear portion for supporting a rear wheel; and
a shock absorber having an upper portion pivotally supported on the vehicle body frame and a lower portion pivotally supported on the swing arm;
wherein the shock absorber includes a tubular buffer and a spring disposed around the buffer with an upper end of the spring being positioned to be lower than an upper end of the buffer and a vehicle body component part being placed at a lateral side of the buffer, a bottom end of the vehicle body component being located above the upper end of the spring and below the upper end of the buffer, and
wherein a connecting tube, which connects a throttle body placed in front of a cushion unit and an air cleaner placed in rear of the cushion unit, and a sub-tank that is the vehicle body component part are located at the right side and the left side, respectively, in a state where a damper case of the buffer is interposed therebetween, and the connecting tube is placed to be close to the buffer above the spring.

* * * * *